United States Patent
Macwan

(10) Patent No.: US 8,925,061 B2
(45) Date of Patent: *Dec. 30, 2014

(54) SYSTEMS AND METHODS FOR USING VOICEPRINTS TO GENERATE PASSWORDS ON MOBILE DEVICES

(71) Applicant: AT&T Intellectual Property I, L.P., Atlanta, GA (US)

(72) Inventor: Sanjay Macwan, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,473

(22) Filed: Jul. 9, 2013

(65) Prior Publication Data
US 2013/0298213 A1 Nov. 7, 2013

Related U.S. Application Data

(63) Continuation of application No. 12/207,207, filed on Sep. 9, 2008, now Pat. No. 8,499,342.

(51) Int. Cl.
*H04L 29/06* (2006.01)
*G06F 21/32* (2013.01)

(52) U.S. Cl.
CPC ............ *G06F 21/32* (2013.01); *H04L 63/0861* (2013.01)

USPC .................... 726/7; 726/5; 713/168; 713/186

(58) Field of Classification Search
CPC ............................ H04L 63/0861; G06F 21/32
USPC ............ 726/5–7; 713/168, 186; 455/410–411
See application file for complete search history.

(56) References Cited

U.S. PATENT DOCUMENTS

| | | | |
|---|---|---|---|
| 5,963,908 A * | 10/1999 | Chadha | 704/273 |
| 7,158,776 B1 | 1/2007 | Estes et al. | |
| 7,263,347 B2 | 8/2007 | Engelhart | |
| 7,698,566 B1 | 4/2010 | Stone | |
| 8,140,340 B2 | 3/2012 | Bhogal et al. | |
| 2003/0149881 A1 | 8/2003 | Patel et al. | |
| 2006/0277043 A1 | 12/2006 | Tomes et al. | |
| 2007/0052517 A1 | 3/2007 | Bishop et al. | |
| 2008/0169903 A1 * | 7/2008 | Fein et al. | 340/5.84 |
| 2008/0312924 A1 | 12/2008 | De Los Reyes et al. | |
| 2009/0083841 A1 | 3/2009 | Gierach | |

* cited by examiner

*Primary Examiner* — Chau Le
(74) *Attorney, Agent, or Firm* — Hartman & Citrin LLC

(57) ABSTRACT

Systems for verifying a user's voiceprint and generating a password for use at one or more application servers are disclosed. The systems can reside on a network or on a device. The application servers can be in communication with one or more devices or networks. Several methods for verifying the identity of the user using possession-based, knowledge-based, location-based, and biometric access control are disclosed.

20 Claims, 8 Drawing Sheets

SYSTEMS AND METHODS FOR USING VOICEPRINTS TO GENERATE PASSWORDS ON MOBILE DEVICES

TECHNICAL FIELD

This application is a continuation of U.S. patent application Ser. No. 12/207,207, now U.S. Pat. No. 8,499,342, filed Sep. 9, 2008.

The present disclosure relates generally to communications networks and, more particularly, to systems and methods for using voiceprints to generate passwords on mobile devices.

BACKGROUND

Biometric systems use a person's distinguishing biological and/or behavioral traits to recognize and/or identify a user. Voice recognition, also known as voiceprint recognition, is a performance biometric, i.e., a user performs a task, speaking, and the biometric system uses the user's speech to verify the user, or to identify the user. Using a user's voiceprint for verification and/or identification can obviate the need for a user to remember or maintain knowledge-based and/or possession-based access-control elements such as, for example, a specific password or token generator, respectively, since the user's voiceprint is used by the biometric system.

Biometric systems can be designed to recognize signal interference, noise variations, mimicry attempts, and/or ordinary voice changes, for example, voice changes that arise due to time of day, illness, fatigue, and the like. Therefore, a well-designed biometric system can provide reliable access-control for some applications.

In practice, biometric systems used to verify users can require the user to complete a registration step, wherein the user's voiceprint is generated by the biometric system and stored for future use. When a user attempts to authenticate with the biometric system, the biometric system can generate a new voiceprint from the user attempting to authenticate, and compare the new voiceprint with the stored voiceprint to determine if there is a match. Similarly, use of biometric systems to identify users can require a collection of voiceprints against which a new voiceprint can be compared. By searching for and identifying a match, the biometric system can determine the identity of the user whose voiceprint is being analyzed for a match.

Voiceprint recognition systems can use acoustic patterns of speech to generate a voiceprint. The acoustic patterns can include anatomical and behavioral characteristics. With respect to anatomical characteristics, the vocal tract is typically described as the speech organs that exist beyond the vocal chords, also known as the vocal folds. The speech organs are generally described as including the laryngeal pharynx, the oral pharynx, the oral cavity, i.e., the void bound by the velum, palate, tongue, and lips, the nasal pharynx, and the nasal cavity, i.e., the void extending from the nasal pharynx to the nostrils. The speech organs can affect the frequency content of speech by altering resonances of the frequency content. As such, the shape and size of the speech organs can often be estimated by analyzing the frequency content of a voice.

Behavioral characteristics, such as voice pitch, speech rate, inflection, dialect, speaking style, accent, and the like, can also be recognized by a biometric system. Such behavioral characteristics are sometimes referred to as "behavioral biometrics" because these characteristics are based on learned speech patterns more than on anatomical structure of the user. The anatomical or behavioral characteristics, and/or a combination thereof, can be identified and used to generate a user-specific voiceprint.

Biometric systems may need to run extremely complex mathematical calculations on a voice signal to determine these and other characteristics, and to compare an obtained voiceprint to a voiceprint stored as a reference. Additional calculations may be undertaken to correct for, or to identify, interference, mimicry, signal degradation, channel shifting, and the like. Enormous amounts of data and data analysis must often be analyzed and/or undertaken to successfully implement a biometric system as a verification or identification access-control mechanism.

SUMMARY

Accordingly, an embodiment of the present disclosure includes a method for generating a password for use by a device in communication with a communications network. The method includes the steps of receiving, at a voiceprint password system, master voice data associated with a user of an application server, storing the master voice data in a storage device associated with the voiceprint password system, receiving, at a voiceprint password system, a request from an entity for the password, obtaining sampled voice data from the entity requesting the password, comparing the sampled voice data the master voice data to determine if the entity requesting the password should be authenticated, and generating the password if the voiceprint password system determines that the entity requesting the password should be authenticated. The determining that an entity requesting the password should be authenticated can be made by determining that the sampled voice data and the master voice data substantially match.

In some embodiments, the method further includes transmitting the password to the application server. In some embodiments, the method further includes transmitting the password to the entity requesting the password. In some embodiments, the method further includes receiving master device data associated with the user, storing the master device data in the storage device, and associating the master device data with the user. The master device data can be information that identifies the device used by the user when submitting the master voice data.

In some embodiments, the method further includes obtaining test device data associated with the entity requesting the password and comparing the test device data with the master device data to determine if the entity requesting the password should be authenticated. The test device data can be information that identifies the device used by the entity requesting the password to access the voiceprint password system.

In some embodiments, the method further includes receiving master authentication data associated with the user, storing the master authentication data in the storage device, and associating the master authentication data with the user. The master authentication data can be a password, a user identification (USERID), and/or other data.

In some embodiments, the method further includes challenging the entity requesting the password for at least one test authentication data, receiving test authentication data, and comparing the test authentication data with the master authentication data to determine if the entity requesting the password should be authenticated. The determination that the entity requesting the password should be authenticated can be made by determining that the master authentication data and the test authentication data substantially match.

According to another embodiment of the present disclosure, a voiceprint password system for generating a password for use by a device in communication with a communications network includes a processor, a communications network interface, and a memory in communication with the processor and the communications network interface. The memory is configured to store instructions, executable by the processor to receive master voice data associated with a user of an application server, store the master voice data in the memory, receive a request from an entity for the password, obtain sampled voice data from the entity requesting the password, compare the sampled voice data to the master voice data to determine if the entity requesting the password should be authenticated, and generate the password if the voiceprint password system determines that the entity requesting the password should be authenticated. The determining that the entity requesting the password should be authenticated can include determining that the sampled voice data and the master voice data substantially match.

In some embodiments, the instructions further include instructions executable by the processor to transmit the password to the application server. In some embodiments, the instructions further include instructions executable by the processor to receive master authentication data associated with the user and to store the master authentication data in the memory. The master authentication data can include a password, a user identification (USERID), and/or other data. In some embodiments, the instructions further include instructions executable by the processor to challenge the entity requesting the password for at least one test authentication data, receive test authentication data, and compare the test authentication data with the master authentication data to determine if the entity requesting the password should be authenticated. The determination that the entity requesting the password should be authenticated includes determining that the master authentication data and the test authentication data substantially match.

In some embodiments, the instructions further include instructions executable by the processor to receive master device data associated with the user, store the master device data in the storage device, and associate the master device data with the user. The master device data can identify the device used by the user when submitting the master voice data. In some embodiments, the instructions further include instructions executable by the processor to obtain test device data associated with the entity requesting the password, and compare the test device data with the master device data to determine if the entity requesting the password should be authenticated. The test device data can identify the device used by the entity requesting the password to access the voiceprint password system.

According to another embodiment of the present disclosure, a mobile communications device for generating a password for use on a communications network can include a processor, a communications network interface, and a memory in communication with the processor and the communications network interface. The memory can be configured to store instructions, executable by the processor to receive master voice data associated with a user of an application server, store the master voice data in the memory, receive a request from an entity for the password, obtain sampled voice data from the entity requesting the password, compare the sampled voice data to the master voice data to determine if the entity requesting the password should be authenticated, and generate the password if the voiceprint password system determines that the entity requesting the password should be authenticated. The determining that the entity requesting the password should be authenticated can include determining that the sampled voice data and the master voice data substantially match.

In some embodiments, the instructions further include instructions executable by the processor to transmit the password to the application server. In some embodiments, the instructions further include instructions executable by the processor to receive master authentication data associated with the user and to store the master authentication data in the memory. The master authentication data can include a password, a user identification (USERID), and/or other data. In some embodiments, the instructions further include instructions executable by the processor to challenge the entity requesting the password for at least one test authentication data, receive test authentication data, and compare the test authentication data with the master authentication data to determine if the entity requesting the password should be authenticated. The determination that the entity requesting the password should be authenticated can include determining that the master authentication data and the test authentication data substantially match.

According to another embodiment of the present disclosure, a computer readable medium includes computer readable instructions that, when executed, perform the steps of receiving, at a voiceprint password system, master voice data associated with a user of an application server, storing the master voice data in a storage device associated with the voiceprint password system, receiving, at a voiceprint password system, a request from an entity for the password, obtaining sampled voice data from the entity requesting the password, comparing the sampled voice data to the master voice data to determine if the entity requesting the password should be authenticated, and generating the password if the voiceprint password system determines that the entity requesting the password should be authenticated. The determining that an entity requesting the password should be authenticated can include determining that the sampled voice data and the master voice data were generated by the same entity. In some embodiments, the computer readable medium further includes instructions that, when executed, perform the steps of transmitting the password to the application server.

In some embodiments, the computer readable medium further includes instructions that, when executed, perform the steps of transmitting the password to the entity requesting the password. In some embodiments, the computer readable medium further includes instructions that, when executed, perform the steps of receiving master device data associated with the user, storing the master device data in the storage device, and associating the master device data with the user. The master device data can be information that includes data that identifies the device used by the user when submitting the master voice data. In some embodiments, the computer readable medium further includes instructions that, when executed, perform the steps of obtaining test device data associated with the entity requesting the password and comparing the test device data with the master device data to determine if the entity requesting the password should be authenticated. The test device data can be information that identifies the device used by the entity requesting the password to access the voiceprint password system.

In some embodiments, the computer readable medium further includes instructions that, when executed, perform the steps of receiving master authentication data associated with the user, storing the master authentication data in the storage device, and associating the master authentication data with the user. The master authentication data can be a password, a user identification (USERID), and/or other data. In some embodiments, the computer readable medium further includes instructions that, when executed, perform the steps of challenging the entity requesting the password for at least one test authentication data, receiving test authentication data, and comparing the test authentication data with the master authentication data to determine if the entity requesting the password should be authenticated. The determination that the entity requesting the password should be authenticated can be made by determining that the master authentication data and the test authentication data substantially match.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
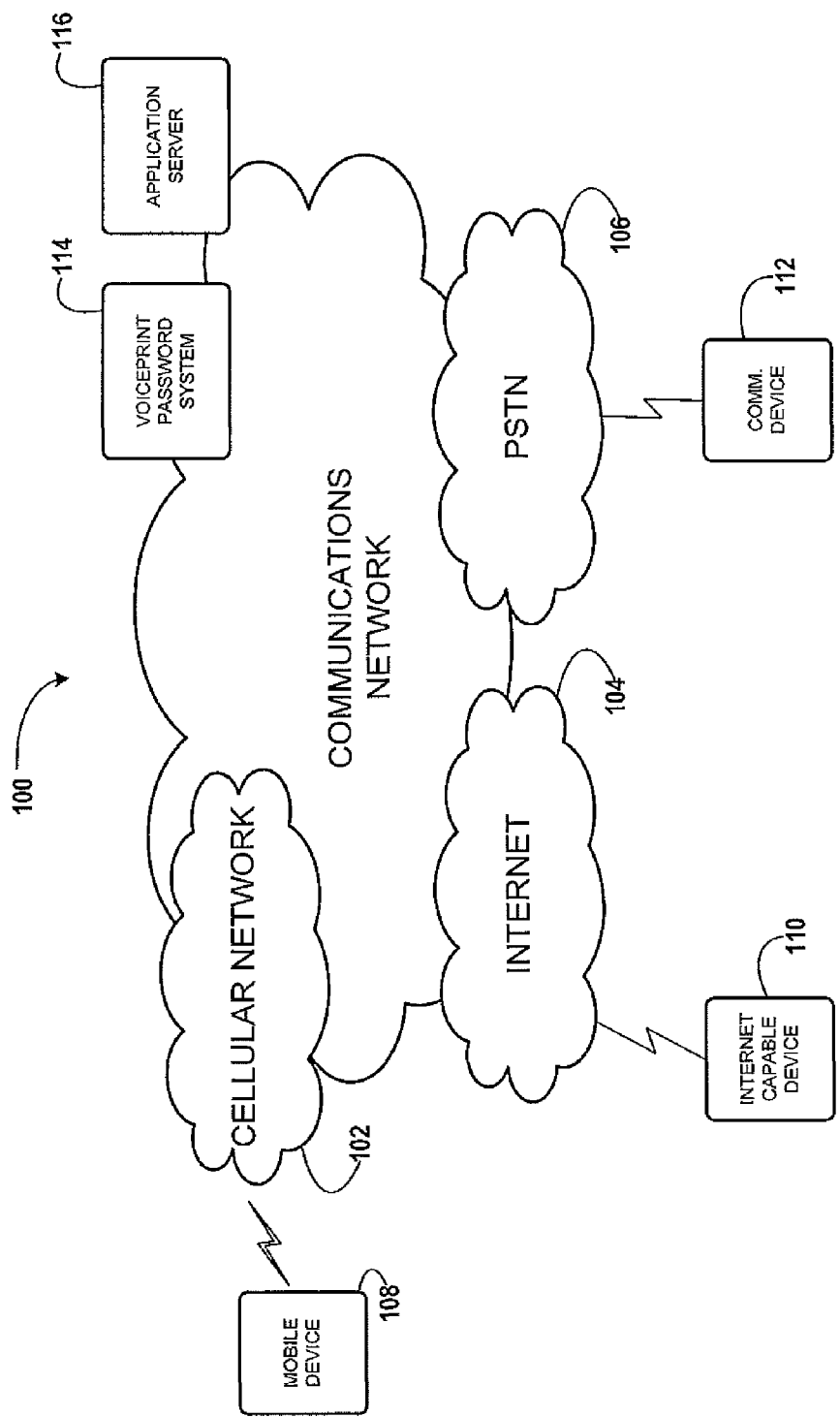
FIG. 1 schematically illustrates an exemplary communications network with which embodiments of the present disclosure can be implemented.

Referring now to the drawings in which like numerals represent like elements throughout the several views, FIG. 1 schematically illustrates an exemplary communications network 100. The illustrated exemplary network 100 includes a cellular network 102, a packet data network 104, for example, the Internet (the Internet), and a circuit switched network 106, for example, a publicly switched telephone network (PSTN). The cellular network 102 can include various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS), and the like. The cellular network 102 can also include radios and nodes for receiving and transmitting voice, data, and combinations thereof to and from radio transceivers, networks, and the Internet 104. A device 108, such as, for example, a cellular telephone, a user equipment, a mobile terminal, a PDA, a laptop computer, a handheld computer, or a combination thereof, can be operatively connected to the cellular network 102.

The cellular network 102 can be configured as a 2G GSM (Global System for Mobile communications) network, and can provide data communications via GPRS (General Packet Radio Service) and EDGE (Enhanced Data rates for GSM Evolution). Additionally, the cellular network 102 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network 102 is also compatible with future mobile communications standards including, but not limited to, pre-4G and 4G, for example.

The illustrated cellular network 102 is shown in communication with the Internet 104 and a PSTN 106, though it should be appreciated that this is not necessarily the case. One or more Internet-capable devices 110, for example, a PC, a laptop, a portable device, a device 108, a smart phone, or any other suitable device, can communicate with one or more cellular networks 102, and devices 108 connected thereto, through the Internet 104. It also should be appreciated that the Internet-capable device 110 can communicate with the Internet 104, through the PSTN 106, the cellular network 102, or a combination thereof. As illustrated, a communications device 112, for example, a telephone, facsimile machine, modem, computer, or the like, can be in communication with the PSTN 106, and therethrough to the Internet 104 and/or the cellular network 102. It should be appreciated that the communications device 112 can be an Internet-capable device, and can be substantially similar to the Internet-capable device 110.

As illustrated, the communications network 100 can include one or more voiceprint password systems 114 (VPS's) and one or more application servers 116 (AS's). A VPS 114 can be hardware, software, and/or a combination thereof. The VPS 114 can be in communication and/or reside upon the cellular network 102, the Internet 104, the PSTN 106, and/or the device 108. Similarly, an AS 116 can be hardware, software, and/or a combination thereof. The AS 116 can be in communication and/or reside upon the cellular network 102, the Internet 104, the PSTN 106, and/or the device 108. Furthermore, the VPS 114 and/or the AS 116 can be accessible by and/or through multiple devices and networks, including private networks, which are not illustrated in FIG. 1. It should be appreciated that substantially all of the functionality described with reference to the communications network 100 can be performed by the cellular network 102 alone, or in combination with other networks, network elements, and the like, including the illustrated networks, and some elements that are not illustrated. While the VPS 114 and the AS 116 are illustrated as being in communication with the communications network 100, it should be understood that the VPS 114 and/or the AS 116 can reside on the cellular network 102, the packet data network 104, and/or a circuit switched network 106. As will be explained in more detail below, the VPS 114 can also reside on a device such as, for example, the device 108, an internet capable device 110, and/or a communications device 112. Similarly, the AS 116 can reside on the device 108, an internet capable device 110, and/or a communications device 112. In some embodiments, the VPS 114 resides on the device 108 and the AS 116 resides on a server in communication with the Internet 104.

Figure 2:
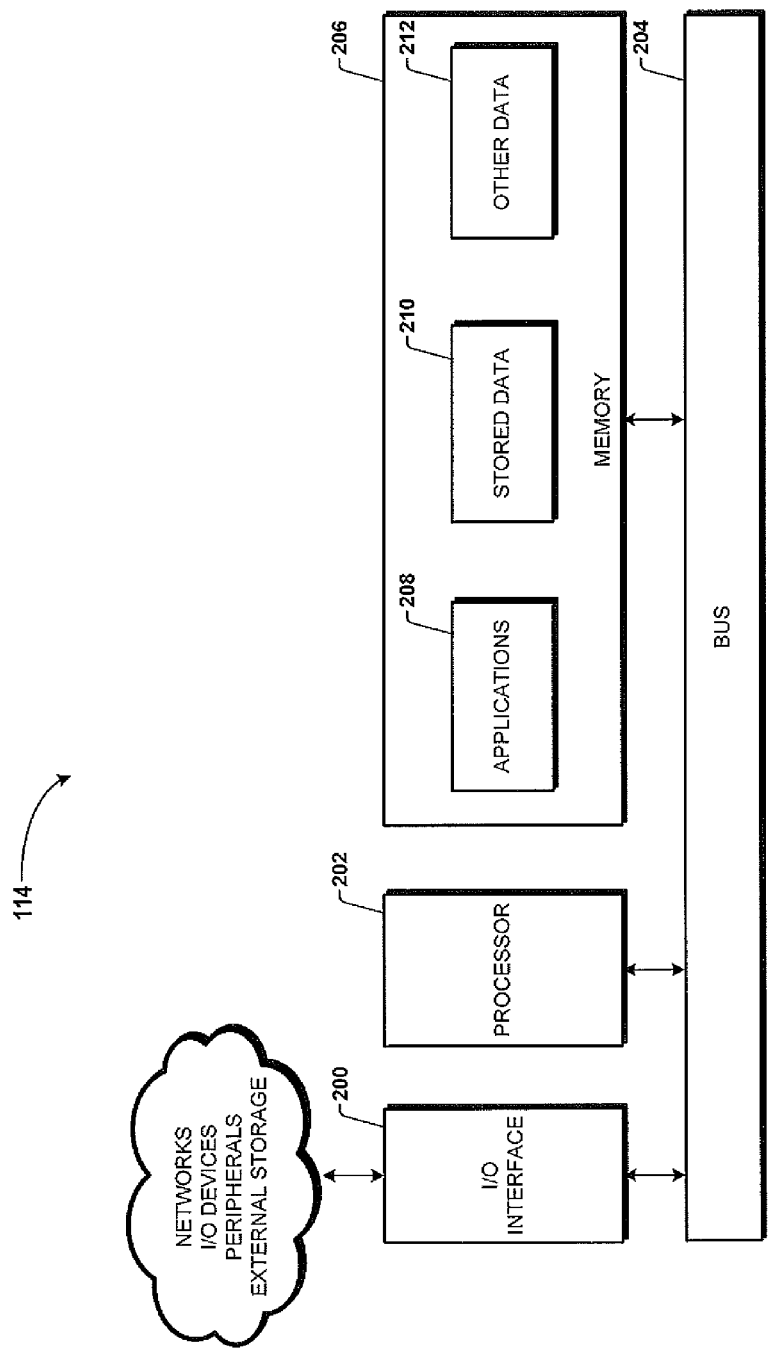
FIG. 2 schematically illustrates a voiceprint password system, according to an exemplary embodiment of the present disclosure.

FIG. 2 schematically illustrates a block diagram of a VPS 114 according to an exemplary embodiment of the present disclosure. The illustrated VPS 114 includes one or more communications network interfaces 200 that are operatively linked and in communication with one or more processors 202 via one or more data/memory busses 204. The communications network interface 200 can be used to allow the VPS 114 to communicate with one or more components of the communications network 100, or any device connected thereto or residing thereon. It should be appreciated that if the VPS 114 resides on mobile device, for example, the device 108, that the communications network interface 200 can be a communications component of the device 108, for example, a short range radio device, a transceiver, receiver, transmitter, antennae, or combinations thereof. The processor 202 is operatively linked and in communication with a memory 206 via the data/memory bus 204.

The word "memory," as used herein to describe the memory 206, collectively includes all memory types associated with the VPS 114 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 206 is illustrated as residing proximate the processor 202, it should be understood that the memory 206 can be a remotely accessed storage system, for example, a server on the Internet 104, a remote hard disk drive, a removable storage medium, combinations thereof, and the like. Moreover, the memory 206 is intended to encompass network memory and/or other storage devices in wired or wireless communication with the VPS 114, which may utilize the communications network interface 200 to facilitate such communication. Thus, any of the data, applications, and/or software described below can be stored within the memory 206 and/or accessed via network connections to other data processing systems (not shown) that may include a local area network (LAN), a metropolitan area network (MAN), or a wide area network (WAN), for example. Accordingly, the present disclosure may operate on the VPS 114, wherein the VPS 114 is configured as a server to one or more client data processing systems as dictated by a client/server model. It should be appreciated that the memory 206 can also be a storage device associated with the device 108, as will be explained in more detail below with reference to FIG. 3. The illustrated memory 206 can include one or more applications 208, stored data 210, and/or other data 212.

The applications 208 can include applications, programs, software, and the like, for analyzing and storing voice data. The applications 208 can include various programs, routines, subroutines, algorithms, software, tools, and the like, for processing and storing voice data, voice models, and/or voiceprints, for example. The applications 208 can be used to analyze the voice data using, for example, decision trees, frequency estimation, Gaussian mixture models, pattern matching algorithms, hidden Markov models, matrix representation, world models, cohort models, and the like. The applications 208 can also include noise reduction algorithms for reducing ambient noise in voice samples. In some embodiments, the applications 208 include voice change applications that modify the voice model to take into account long-term voice changes. For example, a voice change application can record the voice samples submitted during authentication attempts and store the new voice samples after each successful authentication. The stored voice samples can be incorporated into the speaker's voice model for future authentication attempts. In some embodiments, security is enhanced by not taking into account voice changes. In some embodiments, one who experiences difficulty in authenticating can request a reset of his account and generate a new voiceprint for association with his profile. As will be explained in more detail below, the stored voice samples can be stored as a voiceprint generated from voice samples. Similarly, a voiceprint can be generated during attempted authentication and compared to the stored voiceprint, if desired.

The applications 208 can also include password generators. The password generators can include applications, programs, software, and the like, for generating one or more passwords upon request by an authenticated user. In some embodiments, the password generators are specific to one or more applications and or one or more AS's 116. For example, the VPS 114 can communicate with one or more AS's 116 during registration and/or configuration of a user's account. The AS 116 can transmit to the VPS 114 an AS-specific password generator for generating passwords that the AS 116 can recognize as valid. For example, an AS 116 can transmit to a VPS 114 a base password and an algorithm for modifying the base password. As such, the VPS 114 can generate a password in accordance with a scheme that the AS 116 recognizes, while keeping the password generation at a separate location, away from the AS 116.

In some embodiments, generating passwords at a separate location can help enhance security by requiring the password to be issued by a separate entity, away from the AS 116. As such, one intercepting communications with the AS 116 may be unable to intercept the password generation step. In some embodiments, multiple base passwords and multiple applications can be sent to the VPS 114 for using when generating the passwords.

In some embodiments, the AS 116 can instruct the VPS 114 how to generate a password based upon other data, including, but not limited to, a user's IMSI or IMEI, the date and/or time, an authorization code, random data, a user's name, other data, and the like. For example, in one embodiment, the password generator uses a numerical representation of the current time, and applies an algorithm to the numerical representation to generate a new alphanumerical code for use as a password. The time used to generate the password can be passed from the VPS 114 to the AS 116, if desired, or the password can be recognized by the AS 116 as being in a valid format. Other embodiments are possible and contemplated. It should be understood that extremely complex password generation techniques can be performed by the VPS 114.

The applications 208 can also include instructions used to operate the VPS 114 and/or devices connected to the VPS 114, if any. The instructions can include, for example, operating systems, firmware, drivers for peripherals, and the like. The applications 208 can also include, for example, authentication software, billing applications, user interface (UI) applications, usage tracking applications, and the like.

The stored data 210 can include data for one or more users. The stored data 210 can include, for example, user profiles, device data, user preferences, AS-specific data, voice data, combinations thereof, and the like. The stored data 210, for example, profiles, device data, preferences, voice data, AS-specific data, authentication data, and the like, can be correlated to one or more users and retrieved by the VPS 114 when a user connects to the VPS 114, when a user authenticates with the VPS 114, when the VPS 114 authenticates the user's device, and/or at any other time. The voice data can include, for example, audio files generated by recording a user's voice and/or a voiceprint. A voiceprint can include one or more mathematical models generated by, for example, analyzing and/or processing a user's voice with the applications 208. The VPS 114 can also store device data associated with a user.

The device data can include one or more data that identify one or more devices used by the user to connect to the VPS 114, for example, an international mobile subscriber identity (IMSI), an international mobile equipment identity (IMEI), a telephone number, an IP address, an email address, and the like. When a user connects to the VPS 114, the VPS 114 can verify, by examining the device data and the data associated with a device currently connected to the VPS 114, that the user is using a recognized device to connect to the VPS 114. Using device data to authenticate a user can add a possession-based layer of security to the VPS 114 since a user will need to access the VPS 114 with a recognized device to authenticate. While it may be possible for unauthorized users to emulate the user's device, requiring authentication of the user's device can add at least one more layer of protection to the VPS 114 before an unauthorized entity can compromise the VPS 114.

The authentication data can include one or more of, for example, a user identification ("USERID"), a password, an authentication code, a verbal password, and the like. When a user connects to the VPS 114, the VPS 114 can verify, by interfacing with the user, that the user requesting a password knows the authentication data stored by the VPS 114. Using authentication data to authenticate a user can add a knowledge-based layer of security to the VPS 114 since a user will need to know the knowledge-based information to be authenticated by the VPS 114. While it may be possible for unauthorized users to learn, guess, or intercept the user's knowledge-based information, requiring knowledge-based authentication can add at least one more layer of protection to the VPS 114 before an unauthorized entity can compromise the VPS 114. It will be appreciated that the VPS 114 can add multiple layers of security to an authentication process undertaken at an AS 116 by adding a biometric layer of security based on a user's voice, a possession-based layer of security based on the user's device, and/or multiple knowledge-based layers of security based on one or more authentication data.

The other data 212 can include, for example, billing information, account data, user device data, AS-specific data, software, programs, algorithms, hardware data, CODEC's and the like. The other data 212 can also include access account/device data that relates to the user's account and/or one or more devices 108. The account/device data can include, but is not limited to, the user's subscription plan, subscription features, and/or the capabilities of the user's device 108. For example, the VPS 114 can be in communication with one or more billing platforms, subscriber databases, other network nodes, and the like, to receive the account/device data relating to a user's subscription plan, usage, and billing information. Additionally, the account/device data can inform the VPS 114 of the features the user's device 108 supports by indicating one or more of the IMSI or the IMEI, the serial number, a carrier, a software version(s), firmware information, one or more carrier-specific applications, combinations thereof, and the like. As such, the account device data can indicate if the device 108 supports WIFI®, 3G, 2G, EDGE, GPS, A-GPS, network triangulation, BLUETOOTH®, NFC, audio formats, data transfer of audio files, and the like. Additionally, the account/device data can indicate whether services provided by the device 108 are charged/billed on a pre-paid and/or post-paid basis, or if features are available on the device 108. The account/device data can pass-through the VPS 114, or can be stored, at least temporarily. The VPS 114 can use the account/device data to determine, for example, how to determine location of the device 108, how to enforce policies, and the like. Additionally, billing, privacy, safety, and/or other concerns can be used to tailor functionality of the VPS 114 through the account/device data. For example, a user can disable the functionality of the VPS 114 and store a preference indicating disablement of the VPS 114 as an account setting stored in the account/device data. Additionally, the VPS 114 can use billing information to adjust functionality of the VPS 114. For example, a notification can be sent from a billing platform to the VPS 114 and the VPS 114 can disable functionality automatically. A user can be given the ability to override deactivation of some, none, or all desired features or functionality.

The other data 212 can also include a billing module (not illustrated), which can be used to track, collect, and/or report activities of the VPS 114 to a billing system at the VPS 114, or elsewhere on the communications network 100 for billing purposes. The billing module can track, for example, how many password requests and/or how much data is sent and received by the VPS 114 and report this information to a billing system of the communications network 100, for example. Billing and/or charging can be pre-paid or post-paid. The functionality of the voiceprint password system 114 can be charged on any desired basis, including, but not limited to, a per-use basis, as a flat fee, as part of service package, or the like.

As mentioned above, the other data 212 can also include CODEC's. CODEC's can include algorithms, programs, and/or software that is used by a hardware device or software to compresses or decompresses data, for example, video and audio data. It will be appreciated that the term "CODEC," as used herein and in the claims, refers to any algorithm, program, application, routine, subroutine, and the like, used to compress and/or decompress data. In the illustrated VPS 114, the CODEC's can be used to convert voice data to, from, and/or between various formats. The CODEC's can include algorithms that direct computer programs or hardware devices, for example, how to represent a video or audio file in a manner that uses a minimum amount of data while retaining the original video or audio file quality. The use of the CODEC's can reduce the amount of storage space needed to store the voice data. Similarly, the CODEC's can be used to minimize the bandwidth required to transmit audio files to, from, or through the communications network 100, or a device 108, 110, 112 connected thereto. Exemplary formats for the audio files include, but are not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4 or M4A), Windows® media audio (WMA), RealAudio® (RA), free lossless audio codec (FLAC), Apple® lossless encoder (ALE), i.e., Apple® lossless audio codec (ALAC), and other open and proprietary audio formats.

Figure 3:
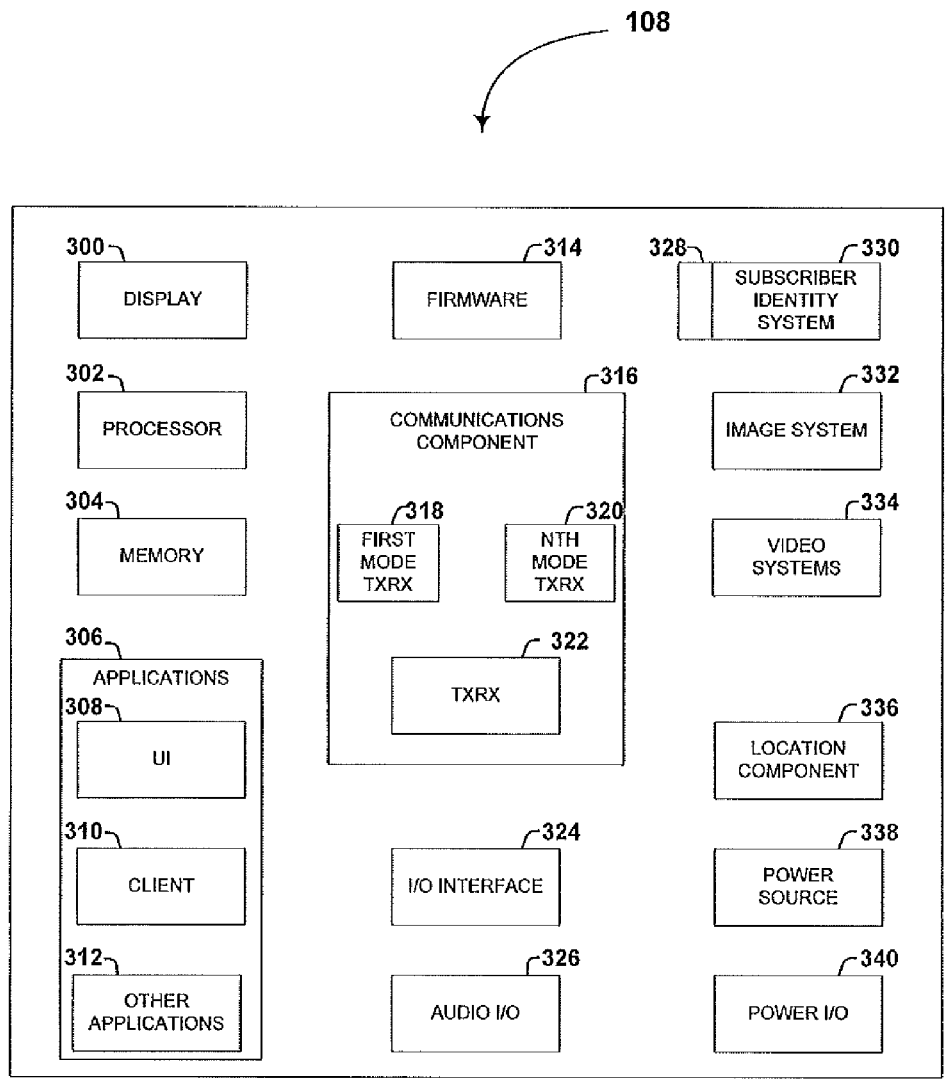
FIG. 3 schematically illustrates a block diagram of an exemplary mobile device for use with exemplary embodiments of the present disclosure.

FIG. 3 illustrates a schematic block diagram of an exemplary device 108 for use in accordance with some exemplary embodiments of the present disclosure. Although no connections are shown between the components illustrated in FIG. 3, the components can interact with each other to carry out device functions.

The device 108 can be a multimode handset. It should be understood that FIG. 3 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 108 can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 108.

The device 108 can include a display 300 for displaying multimedia such as, for example, text, images, video, telephony functions such as Caller ID data, setup functions, menus, music, metadata, messages, wallpaper, graphics, Internet content, device status, preferences settings, map and location data, and the like. The device 108 can include a processor 302 for controlling, and/or processing data. A memory 304 can interface with the processor 302 for the storage of data and/or applications 306. An application 306 can include, for example, voiceprint software, password generator software, web browsing software, mapping software, video player software, voicemail software, file format conversion software, archival software, audio playback software, music player software, email software, messaging software, combinations thereof, and the like. The application 306 can also include a user interface (UI) application 308. The UI application 308 can interface with a client 310 (e.g., an operating system) to facilitate user interaction with device functionality and data, for example, answering/initiating calls, entering/deleting data, password systems, configuring settings, address book manipulation, multimode interaction, and the like. The applications 306 can include other applications 312 such as, for example, firmware, visual voicemail software, add-ons, plug-ins, voice recognition, call voice processing, voice recording, messaging, e-mail processing, video processing, image processing, voicemail file archival, converting, and forwarding, music play, combinations thereof, and the like, as well as subsystems and/or components. The applications 306 can be stored in the memory 304 and/or in a firmware 314, and can be executed by the processor 302. The firmware 314 can also store code for execution during initialization of the device 108.

A communications component 316 can interface with the processor 302 to facilitate wired/wireless communications with external systems including, for example, cellular networks, location systems, VoIP networks, LAN, WAN, MAN, PAN, that can be implemented using WIFI®, WIMAX™, combinations and/or improvements thereof, and the like. The communications component 316 can also include a multi-mode communications subsystem for providing cellular communications via different cellular technologies. For example, a first cellular transceiver 318 can operate in one mode, for example, GSM, and an Nth transceiver 320 can operate in a different mode, for example UMTS. While only two transceivers 318, 320 are illustrated, it should be appreciated that a plurality of transceivers can be included. The communications component 316 can also include a transceiver 322 for unlicensed communications using technology such as, for example, WIFI®, WIMAX™, BLUETOOTH®, infrared, IRDA, NFC, RF, and the like. The communications component 316 can also facilitate communications reception from terrestrial radio networks, digital satellite radio networks, Internet-based radio services networks, combinations thereof, and the like. The communications component 316 can process data from a network such as, for example, the Internet, a corporate intranet, a home broadband network, and the like, via an ISP, DSL provider, or broadband provider.

An input/output (I/O) interface 324 can be provided for input/output of data and/or signals. The I/O interface 324 can be a hardwire connection, such as, for example, a USB, mini-USB, audio jack, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, microphones, remote control devices, monitor, display, LCD, combinations thereof, and the like. It should be appreciated that the I/O interface 324 can be used for communications between the device and a network or local device, instead of, or in addition to, the communications component 316.

Audio capabilities can be provided by an audio I/O component 326 that can include a speaker for the output of audio signals and a microphone to collect audio signals. The device 108 can include a slot interface 328 for accommodating a subscriber identity system 330 such as, for example, a SIM or universal SIM (USIM). The subscriber identity system 330 instead can be manufactured into the device 108, thereby obviating the need for a slot interface 328. In some embodiments, the subscriber identity system 330 can store certain features, user characteristics, rules, policies, and the like. The subscriber identity system 330 can be programmed by a manufacturer, a retailer, a customer, a network operator, and the like.

The device 108 can include an image capture and processing system 332. Photos and/or videos can be obtained via an associated image capture subsystem of the image system 332, for example, a camera. The device 108 can also include a video component 334 for processing, recording, and/or transmitting video content.

A location component 336, can be included to send and/or receive signals such as, for example, GPS data, A-GPS data, WIFI®/WIMAX™ and/or cellular network triangulation data, combinations thereof, and the like. The location component 336 can interface with cellular network nodes, telephone lines, satellites, location transmitters and/or beacons, wireless network transmitters and receivers, for example, WIFI® hotspots, radio transmitters, combinations thereof, and the like. The device 108 can obtain, generate, and/or receive data to identify its location or can transmit data used by other devices to determine the device 108 location. The device 108 can include a power source 338 such as batteries and/or other power subsystem (AC or DC). The power source 338 can interface with an external power system or charging equipment via a power I/O component 340.

Figure 4:
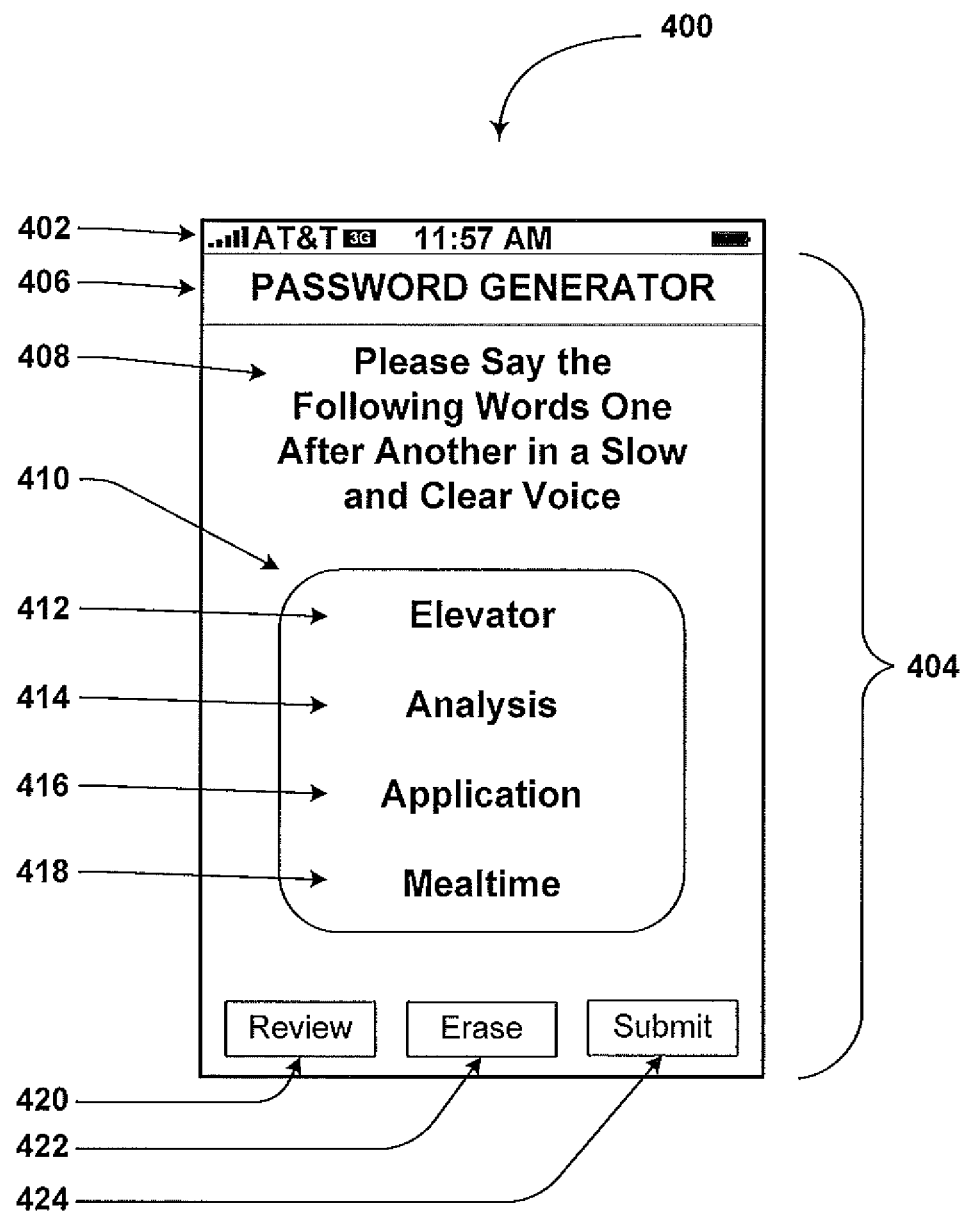
FIG. 4 illustrates a graphical user interface (GUI) for providing an interface with which to control a voiceprint password system, according to an exemplary embodiment of the present disclosure.

FIG. 4 illustrates an exemplary GUI 400 for a device 108, according to an exemplary embodiment of the disclosure. In some embodiments, the GUI 400 is displayed by a video output source on a display 300 of a device 108. As illustrated, the GUI 400 can include operational information 402 for the device 108. The operational information 402 can include network information, for example, a signal meter for displaying the measured strength of a network signal, and information relating to the network with which the device 108 is in communication. In the illustrated GUI 400, the device 108 is indicating a maximum signal strength and that the device 108 is currently connected to the AT&T 3G (third generation) network. It should be understood that this indication is exemplary only. The GUI 400 can be used on devices operating on other networks, other protocols, and/or operated by other carriers. The operational information 402 can also include, for example, the time of day, a date, a message waiting indicator, a battery meter, a short range radio communications device indicator, an alarm indicator, other information, and the like.

The GUI 400 includes a password generator interface 404 for interfacing with a user to generate a password. As will be explained in more detail below, the VPS 114 can reside on the device 108 or on the communications network 100. The device 108 can interface with the user and the VPS 114 to provide the functionality of the VPS 114 described herein. If the VPS 114 resides on the communications network 100, the device 108 can provide data and/or voice connections and the device 108 and/or the user can communicate with the VPS 114. The password generator interface 404 includes a title portion 406 for indicating to a user the function currently being performed by the device 108. The password generator interface 404 can include an instruction 408 to a user, instructing the user what to do to generate a password. As illustrated, the instruction 408 can instruct a user to speak one or more words and/or phrases, for example, the words or phrases displayed to the user in a word/phrase box 410. The word/phrase box is illustrated as including four words 412, 414, 416, 418. The illustrated words are exemplary only, and other words and/or phrases can be included.

The GUI 400 can include various options, for example, an option 420 to review the spoken phrases, an option 422 for erasing the spoken phrases, an option 424 to submit the spoken phrases, additional and/or alternative options (not illustrated), combinations thereof, and the like. It should be understood that the illustrated options 420, 422, 424 are exemplary only. Additional and/or alternative options are possible and contemplated.

In operation, a device 108 can initiate the password generator at direction of an external entity or a user. In some embodiments, the device 108 can recognize a password field and can provide the user with an option to access the password generator, as will be explained in more detail below with reference to FIG. 5. It should be understood that the illustrated GUI 400 is only one contemplated embodiment of the password generator. When the password generator is initialized, the device 108 can communicate with the VPS 114, externally or internally, and receive instructions from the VPS 114 directing the device 108 how to authenticate the user. In the illustrated embodiment, the VPS 114 instructs the device 108 to obtain voice samples from the user. As explained above, a selection of words and/or phrases can be presented to the user for recitation. The words and/or phrases can be selected using any desired criteria, including, but not limited to, the noun and/or vowels sounds included in the words and/or phrases, the possibility of alternative pronunciations, the number of syllables in the words, the size of the audio file that is expected to be generated by recitation of the words, combinations thereof, and the like. Certain sounds can reveal various anatomical and behavioral characteristics of the speaker. For example, some sounds can reveal the expected size and length of the vocal tract, lung capacity, and the like. Similarly, certain sounds can reveal the expected structure of the speaker's teeth, lips, and tongue. A word like "soda" can require a speaker to recite an "s," which can reveal the expected configuration of the speaker's teeth, and a long "o," which can reveal the expected size and length of the speaker's vocal tract. These examples are exemplary only and it should be appreciated that the details of speech analysis and voice recognition methods are not disclosed here in detail for the sake of brevity.

Regardless of the words and/or phrases chosen, the user can recite the words and/or phrases. After reciting the words and/or phrases, the user can review the audio files, erase the audio files and rerecord recitation of the words and/or phrases, and submit the audio files, if he is satisfied with the recordings. Other options are possible and are contemplated. It is also contemplated that the VPS 114 can request recitation of fewer words, more words, letters, numbers, sentences, and the like. In some embodiments, components of the VPS 114 reside on the device 108 and the communications network 100. A component of the VPS 114 residing on the device 108 can verify the user's voiceprint and communicate the successful authentication with a component of the VPS 114 residing on the communications network 100. The component of the VPS 114 residing on the communications network 100 can generate the password. This embodiment can be advantageous because the device 108 may have more limited computing power than a VPS 114 that resides on a server or device connected to the communications network 100, for example. The methods of generating a password are explained in more detail below with reference to FIGS. 6-8.

Figure 5:
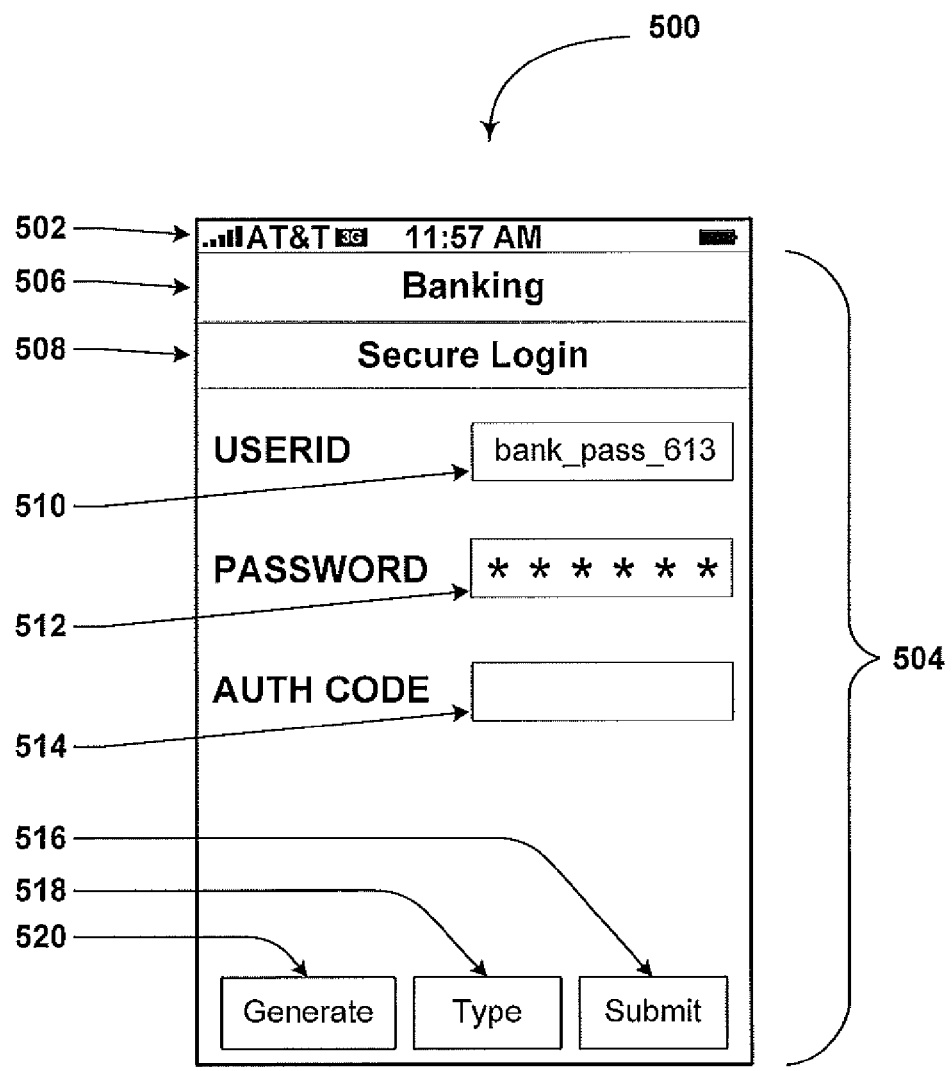
FIG. 5 illustrates a GUI for providing on-demand requesting and generation of a voiceprint password, according to an exemplary embodiment of the present disclosure.

FIG. 5 illustrates another exemplary GUI 500 for a device 108, according to an exemplary embodiment of the disclosure. In some embodiments, the GUI 500 is displayed by a video output source on a display 300 of a device 108. The GUI 500 can include operational information 502 for the device 108, as explained above with reference to the GUI 400 of FIG. 4.

The GUI 500 includes an interface portion 504 for interfacing with a user of the device 108. The illustrated interface portion 504 is illustrated as providing banking information to a user of the device 108. The interface portion 504 includes a title portion 506 and a subtitle portion 508 for displaying to the user what function the device 108 is currently performing. In the illustrated embodiment, the device 108 is connected to a banking application and the user is currently being authenticated at a secure login associated with the banking application. As illustrated, the secure login can require a user to enter into a field 510 a USERID. In the illustrated exemplary GUI 500, the user has entered the USERID "bank_pass_613." This USERID is exemplary only.

In some embodiments, the secure login associated with the banking application can require the user to enter a password in a password field 512. The device can disguise entered characters as filler characters such as asterisks (*), circles (°), exes (X), no character, other characters, and the like. The secure login can also require a user to enter an authorization code in an authorization code field 514. The authorization code can be a static password, a dynamic password, a single use password, and the like. In some embodiments, the authorization code is a single-use password that is generated by a VPS 114, an AS 116, or an application running at the device 108.

The GUI 500 can include various options, for example, an option 516 to submit the secure login form, an option 518 to type characters into the fields 510, 512, 514, an option 520 to generate an authorization code, additional and/or alternative options, combinations thereof, and the like. The illustrated options 516, 518, 520 are exemplary only.

The options 516, 518, 520 can be used by a user to fill and submit a password form. The "Generate" option 520 can be used by the device 108 to provide a user with access to an application that communicates with the VPS 114 to generate a password. In some embodiments, the application is a password generator similar to that described in FIG. 4. In some embodiments, the device 108 includes a web browser that recognizes a password field by identifying a "password" html tag, for example. When a user selects a recognized password field, the device 108 can present the user with an option similar to the "Generate" option 520 described above. Selection of the option 520 to generate an authorization code can launch the password generator or another password generation application. It should be understood that selection of the "Generate" option 520 can initiate a voice connection with a VPS 114. The VPS 114 can guide a user through the authentication steps described above, and the VPS 114 can generate a password. The VPS 114 can direct the device 108 to present the password to the user, or the VPS 114 can transmit the password to the device 108 via, for example, an email message, a multimedia message service (MMS) message, a short message service (SMS) message, a special purpose short message, a unstructured supplementary service data (USSD) message, another message format, and the like. The password generator can interface with the user, for example, using the exemplary GUI 400 of FIG. 4.

Figure 6:
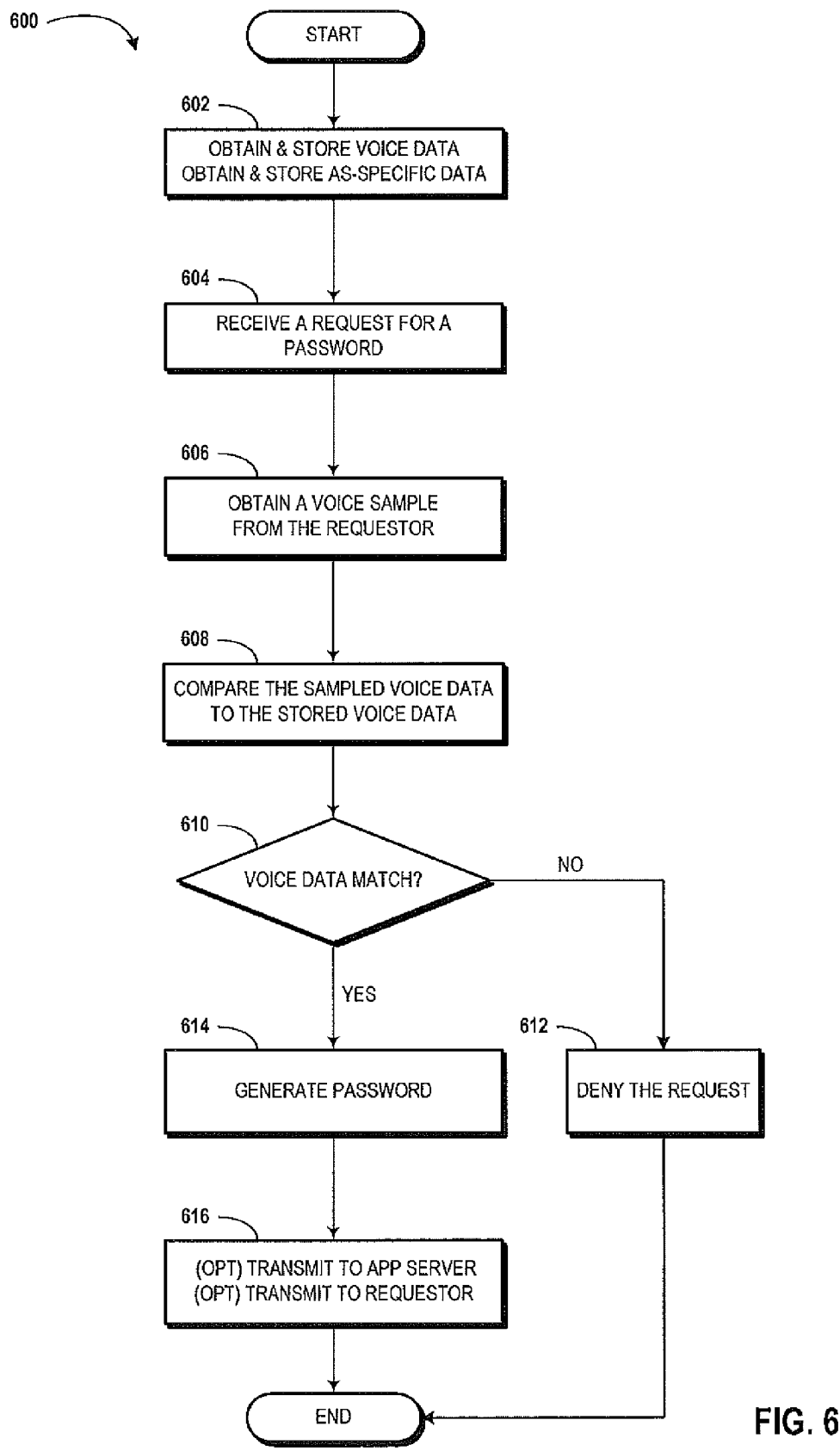
FIG. 6 schematically illustrates a method for requesting and generating a password, according to an exemplary embodiment of the present disclosure.

FIG. 6 schematically illustrates a method 600 for requesting and generating a password, according to an exemplary embodiment of the disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

To avoid complicating the disclosure, the following description will describe in general terms performance of methods embodying some concepts of the disclosure. In reading the description of the several methods herein, and not only the exemplary method 600 of FIG. 6, it should be understood that a user can interact with a VPS 114 using a telephone user interface (TUI), a GUI, a web UI, and/or another UI. Alternatively, a user can interact with the device 108, and the device 108 can handle all communication needed to instruct the VPS 114 how to carry out the user's desired actions. Additionally, as explained above, the VPS 114 can reside on the device 108, in which case the user can interface with the device 108 to control the VPS 114. Therefore, DMTF-driven TUI's, icon-based GUI's, touch-sensitive and multi-touch sensitive screen GUI's, voice-driven TUI's, and the like are included in the following description and are included in the scope of the appended claims.

The method 600 begins, a flow proceeds to block 602, wherein the VPS 114 obtains and stores voice data associated with a user. In some embodiments, the VPS 114 is linked and in communication with one or more application servers (AS's) 116. As explained above, the AS's 116 can be hardware, software, and/or a combination thereof, that provide goods and/or services to a user. For example, an AS 116 can be an online banking server that provides a user with access to his personal, business, and/or brokerage accounts. By way of another example, an AS 116 can be an online store that provides a portal through which a user can search through and/or purchase goods or services. Many other applications are contemplated, and within the scope of the appended claims.

In some embodiments, an AS 116 obtains voice data from a user and stores the voice data. The VPS 114 can request voice data from an AS 116, or the AS 116 can forward the voice data to the VPS 114. The AS 116 and/or the VPS 114 can store the voice data and associate the voice data with a user. An AS 116 and/or a VPS 114 can store voice data for more than one user.

At block 602, the VPS 114 can also store one or more AS-specific password generation applications, as explained in more detail above with respect to FIG. 2. The stored AS-specific data can also be updated at any time to add or remove password generation support, if desired. The VPS 114 can store and/or update AS-specific data at the user's direction, or by direct communication with the one or more AS's 116. In some embodiments, the one or more AS's 116 are configured to communicate with the VPS 114 when a user requests VPS 114 support through an AS 116.

A user can access an AS 116 and attempt to access goods and/or services provided by the AS 116. The AS 116 can require that the user authenticate, for example, by entering a USERID, a password, and/or a single-use password. In the illustrated embodiment, the AS 116 requires at least a single-use password from the user to access the AS 116. The AS 116 can inform a user that a single-use password is needed to access the desired goods/services. In some embodiments, the user can initiate a data and/or voice communication with the VPS 114 to generate a single-use password. In some embodiments, the AS 116 can initiate a data and/or voice connection with the VPS 114 and connect the user with the VPS 114. Regardless of how the user is connected with the VPS 114, the VPS 114 can receive a request for a single-use password from a user, as illustrated at block 604.

The VPS 114 can communicate with the user via a voice and/or data connection. Through the communication, the VPS 114 can request and obtain a voice sample from the user, as illustrated at block 606. In some embodiments, the VPS 114 sends commands to the device 108, and the device 108 displays the commands for the user via a GUI, for example, the GUI's illustrated in FIGS. 4 and/or 5. In some embodiments, the VPS 114 asks the user to recite one or more words or phrases to obtain voice data from the user. If the request is made through the device 108, the device 108 can record the user while he recites the one or more words or phrases, and the device 108 can transmit the recorded audio data to the VPS 114. Additionally, or alternatively, the VPS 114 can communicate with the user via a voice connection and voice commands. When the user speaks, the VPS 114 can record the spoken words or phrases. Regardless of how the audio data is received by the VPS 114, the VPS 114 can compare the sampled voice data to the stored voice data, as illustrated at block 608. Voice recognition will not be described in great detail herein for the sake of brevity, but it should be understood that a voiceprint can be generated by the sampled voice data if desired.

At block 610, the VPS 114 can determine if the sampled voice data matches the stored voice data. If the VPS 114 determines that the sampled voice data does not match the stored voice data, then the method 600 can proceed to block 612, wherein the VPS 114 can deny the request for a password, and the method 600 can end. Although not illustrated in FIG. 6, prior to ending, the method 600 can proceed to additional and/or repeated attempts to authenticate the user. If the VPS 114 determines that the sampled voice data matches the stored voice data, the method 600 can proceed to block 614, wherein the VPS 114 can generate a single-use password. In some embodiments, generated passwords are created with a time limit that is set by the VPS 114, by the AS 116, the device 108, the user, and/or predetermined based on various factors. The VPS 114, the AS 116, and/or the device 108 can communicate the time limit to the other entities, as desired. In some embodiments, the password time limit is one minute. Other contemplated time limits include various numbers of seconds, minutes, hours, and/or dates. Time limits can be changed as needed by authorized entities.

As illustrated at block 616, the VPS 114 can transmit the generated password to the user, and the user can communicate the generated password to the AS 116. In some embodiments, the VPS 114 also transmits the generated password to the AS 116. As such, the AS 116 knows and can verify the generated password when the user communicates the password to the AS 116. In some embodiments, the VPS 114 communicates the generated password to the user, and the user communicates the generated password to the AS 116. The AS 116 initiates a communication with the VPS 114 to verify the generated password. In still other embodiments, the VPS 114 generates the password and transmits the password to the AS 116. The user is authenticated without having to communicate the generated password to the AS 116. In still other embodiments, there is no communication between the VPS 114 and the AS 116, but the AS 116 is able to recognize a validly-generated password and validate the password entered by the user. The method 600 can end.

Figure 7:
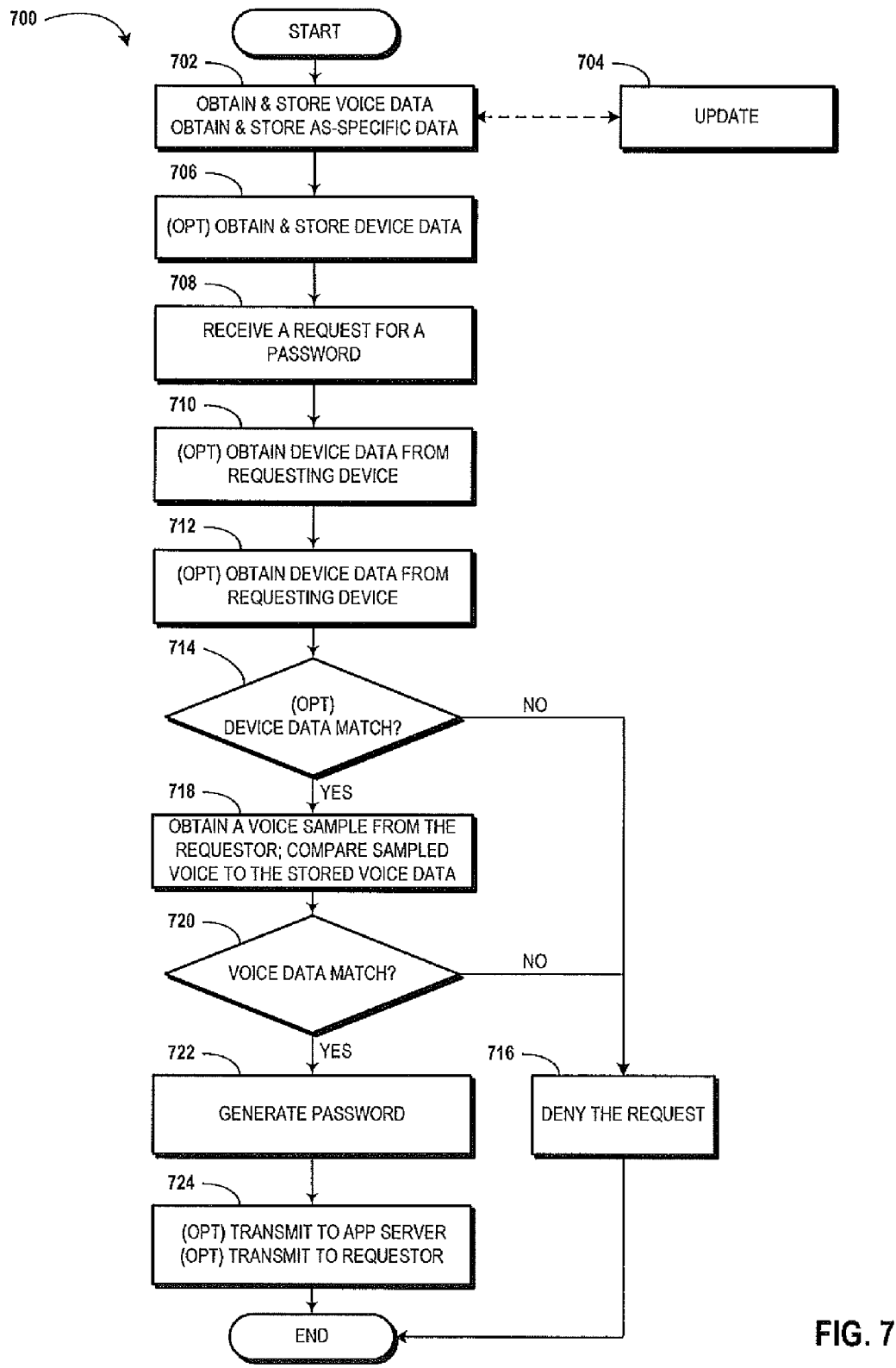
FIG. 7 schematically illustrates a method for requesting and generating a password, according to an alternative exemplary embodiment of the present disclosure.

FIG. 7 schematically illustrates a method 700 for requesting and generating a password, according to an alternative exemplary embodiment of the disclosure. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed by execution of computer-readable instructions included on a computer readable medium.

The method 700 begins, and flow proceeds to block 702, wherein a VPS 114 obtains and stores voice data relating to a user. The VPS 114 can also obtain and store password generation data relating to a designated AS 116. As explained above, the AS-specific data can include one or more base passwords, one or more algorithms for generating future passwords, one or more password generation applications, password software, combinations thereof, and the like. The VPS 114 can use the AS-specific data to generate passwords for use at the AS 116 that the AS 116 can recognize and/or verify as valid passwords. At any time, the voice data and/or the AS-specific data can be updated by a user, network operator, and/or another authorized entity, as illustrated at block 704. Updating the voice data and/or the AS-specific data can include, for example, a user adding an additional AS 116 for which voiceprint password generation functionality is desired. The VPS 114 can associate more than one AS-specific data with a user, if desired. As such, a user can use the VPS 114 to generate a password for use when accessing more than one AS 116.

Optionally, as illustrated at block 706, the VPS 114 can store data relating to one or more devices associated with the user, for example, one or more device 108, one or more internet capable devices 110, and/or one or more communications devices 112. As explained above, the device data can include one or more IMSI's, IMSI's, IP addresses, telephone numbers, combinations thereof, and the like. The VPS 114 can store the device data to use during user authentication of the user and/or the device, as will be explained in more detail below. The VPS 114 can obtain and store the device data, if desired, and the device data can be updated at any time.

At some time, a user can access an AS 116 and request goods and/or services from the AS 116. The AS 116 can inform the user that a password is required to access the requested goods and/or services. The user can initiate a voice and/or data communication with the VPS 114. Additionally, or alternatively, the AS 116 can initiate a communication with the VPS 114. Regardless of how a communication is established between the VPS 114 and the user, the VPS 114 can receive a request for a password, as shown at block 708. In some embodiments, connection to the VPS 114 is understood by the VPS 114 to be a request for a password.

Optionally, as illustrated at block 710, the VPS 114 can obtain device data from the device attempting to obtain a password. The obtained device data can be obtained for security purposes, for example, to track the generation of passwords and the devices from which the password requests originated. Additionally, or alternatively, the VPS 114 can obtain the device data for purposes of authenticating the device used by the requesting party. For example, if the VPS 114 stored device data associated with a user at block 706, the VPS 114 can obtain a requestor's device data and compare the requestor's device data to the stored device data, as illustrated at optional block 712, to verify that the requestor is attempting to access the account with a device recognized as the user's device.

Optionally, as illustrated at block 714, the VPS 114 can compare the obtained device data and the stored device data to determine if the obtained device data and the stored device data match. By requiring that obtained device data and stored device data match, the VPS 114 can add an additional layer of security by authenticating the user's device prior to attempting to authenticate the user's voice. Such a requirement can add a possession-based layer of security, by restricting authentication to a user who accesses the VPS 114 with a device recognized by the VPS 114 as the user's device.

If the VPS 114 determines that the stored device data and the obtained device data do not match, the method 700 can proceed to block 716, wherein the VPS 114 can deny the password request and the method 700 can end. Although not illustrated in FIG. 7, prior to ending, the method 700 can proceed to additional and/or repeated attempts to authenticate the user. If the VPS 114 determines that the stored device data and the obtained device data match, the method 700 can proceed to block 718, wherein the VPS 114 can obtain a voice sample from the requesting entity and compare the sampled voice data to the stored voice data. The verification of the sampled voice data can be substantially similar to the verification process described above with reference to blocks 608-610 of FIG. 6.

As illustrated at block 720, the VPS 114 can determine if the sampled voice data and the stored voice data match. If the VPS 114 determines that the sampled voice data and the stored voice data do not match, the method 700 can proceed to block 716, the password request can be denied, and the method 700 can end. Although not illustrated in FIG. 7, prior to ending, the method 700 can proceed to additional and/or repeated attempts to authenticate the user. If the VPS 114 determines that the sampled voice data and the stored voice data match, the method 700 can proceed to block 722, wherein the VPS 114 can generate a password. The generation of the password can be substantially similar to the process described above with reference to block 614 of FIG. 6. As illustrated at block 724, the VPS 114 can transmit the generated password to the AS 116, a device, and/or a combination thereof. As explained above, the AS 116 can also connect to the VPS 114 to verify the password after the user presents the password to the AS 116. The method 700 can end.

Figure 8:
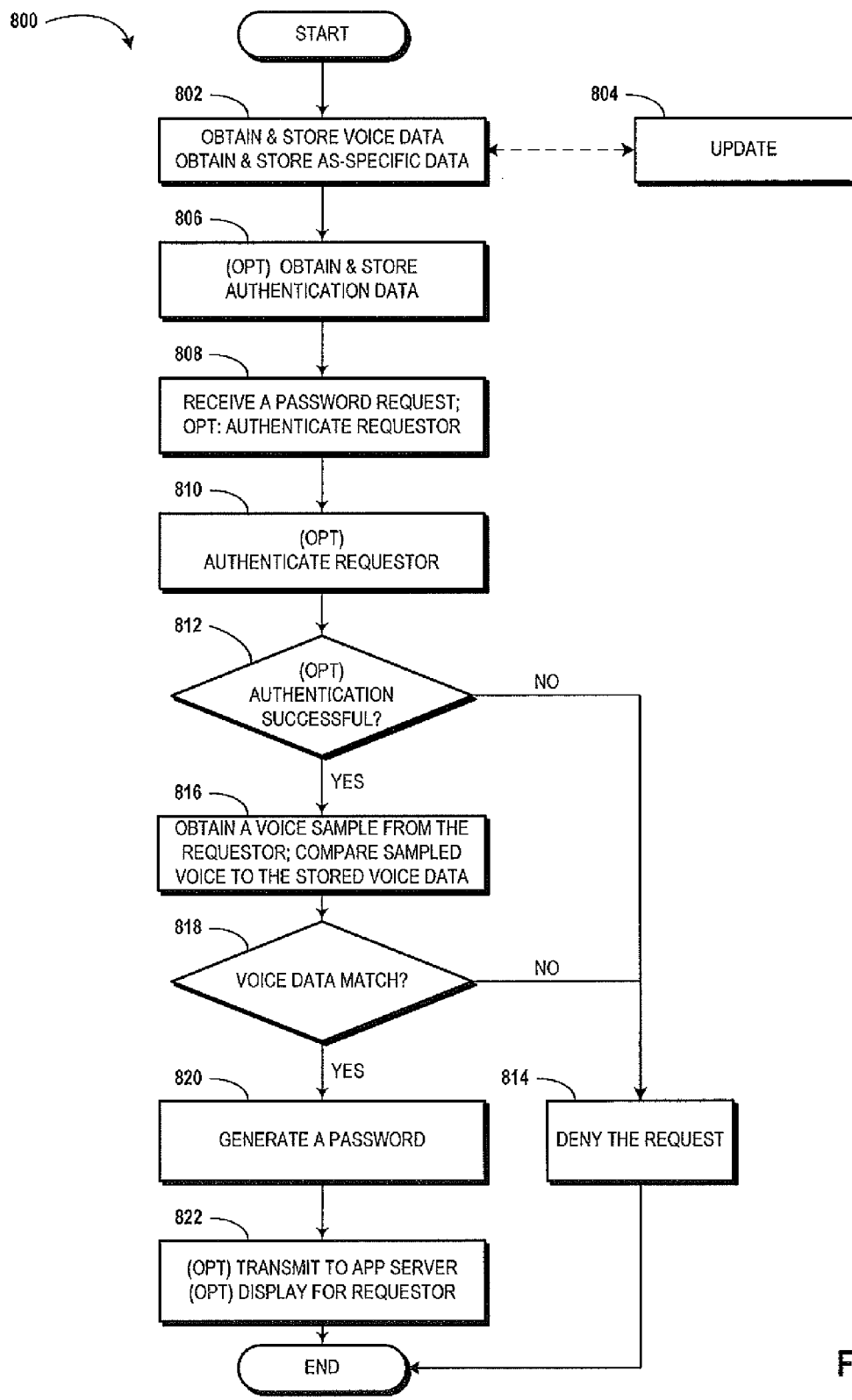
FIG. 8 schematically illustrates a method for requesting and generating a password, according to another alternative embodiment of the present disclosure.

FIG. 8 schematically illustrates a method 800 for requesting and generating a password, according to another alternative exemplary embodiment of the disclosure. It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

The method 800 begins, and flow proceeds to block 802, wherein a VPS 114 obtains and stores voice data relating to a user. In the illustrated method 800, the VPS 114 resides on a device 108 and can include hardware, software, and/or a combination thereof. The VPS 114 can also obtain and store password generation data relating to a designated AS 116. As explained above, the AS-specific data can include one or more base passwords, one or more algorithms for generating future passwords, one or more password generation applications, password software, combinations thereof, and the like. The VPS 114 can use the AS-specific data to generate passwords for use at the AS 116 that the AS 116 can recognize and or validate as valid passwords. In some embodiments, the voice data relating to the user and/or a password required for generating a password can be stored in a storage location of the device 108, for example, the memory 304 and/or the device SIM 330. In some embodiments, the voice data is encrypted and stored in a secure format to help reduce the ease with which the voice data can be accessed by unauthorized entities. In some embodiments, the voice data and/or password data can be stored in the SIM 330 during initialization and/or set-up of the device 108, for example, by a user, a retailer, network operator, and/or the like.

In some embodiments, the voice data and/or the AS-specific data can be updated at any time by a user, network operator, and/or another authorized entity, as illustrated at block 804. Updating the voice data and/or the AS-specific data can include, for example, a user adding an additional AS 116 for which voiceprint password generation functionality is desired. Additionally, updating the voice data can include resetting the user's account and/or generating a new voiceprint when the user's voice changes due to age, illness, and the like. It should be appreciated that the individual voice samples can be stored as audio files for generating a voiceprint as voiceprint generation methods improve and/or otherwise change. As such, a voiceprint can be kept up to date using new technology, as desired. The VPS 114 can associate more than one AS-specific data with a user, if desired. As such, a user can use the VPS 114 to generate a password for use when accessing more than one AS 116.

As illustrated at optional block 806, the VPS 114 can also store authentication data. Authentication data can include a password and/or a USERID, for example. The VPS 114 can require entry of the USERID and/or password before attempting to authenticate the user's voice, if desired, to add an additional layer of security to the password generation functions of the VPS 114.

At some time, as illustrated at block 808, the VPS 114 can receive a request for a password from a user. As described above with reference to FIGS. 4 and 5, the request can be received from a local user, for example, via a JAVA applet, an onboard application, and/or the like. As illustrated at optional block 810, the VPS 114 can authenticate the user by requiring the user to enter a knowledge-based password and/or USERID. At optional block 812, the VPS 114 can determine if the user entered the correct USERID and/or password. If the VPS 114 determines that the user did not enter the correct USERID and/or password, the method 800 can proceed to block 814, wherein the VPS 114 can deny the password request, and the method 800 can end. Although not illustrated in FIG. 8, prior to ending, the method 800 can proceed to additional and/or repeated attempts to authenticate the user.

If the VPS 114 determines that the user entered the correct USERID and/or password, the method 800 can proceed to block 816, wherein the VPS 114 can obtain a voice data sample from the requesting user and can compare the sampled voice data to stored voice data. As explained above, the VPS 114 can obtain a voice data sample through interacting with a user. For example, the VPS 114 can interact with the user via the exemplary GUI's illustrated in FIGS. 4 and 5. As illustrated at block 818, the VPS 114 can determine if the sampled voice data matches the stored voice data, as explained above with reference to block 610 of FIG. 6. If the VPS 114 determines that the sampled voice data does not match the stored voice data, the method 800 can proceed to block 814, the password request can be denied, and the method 800 can end. Although not illustrated in FIG. 8, prior to ending, the method 800 can proceed to additional and/or repeated attempts to authenticate the user. If the VPS 114 determines that the sampled voice data matches the stored voice data, the method 800 can proceed to block 820, wherein the VPS 114 can generate a password, as explained above with reference to block 614 of FIG. 6. As illustrated at block 822, the VPS 114 can display the generated password for the user, transmit the generated password to the AS 116, or both. The method 800 can end.

It should be appreciated that the VPS 114 and/or the AS 116 can be located on different networks and can be operated by different entities. In some embodiments, the VPS 114 and the AS 116 are operated by a communications provider and a service provider, respectively. In one embodiment, the communications provider and the service provider enter into an arrangement, wherein the communications provider operates the VPS 114 and the service provider registers the AS 116 with the VPS 114, or a device associated with the VPS 114, of the communications provider. In other embodiments, the service provider operates, controls, or directs the control of, the VPS 114.

Additionally, some embodiments of the present disclosure include the use of location-based information as authentication data during password generation. For example, if a user access the VPS 114 using a communications device 112 or internet-capable device 110, the VPS 114 can communicate with a node of the communications network 100, for example, an HLR, VLR, or the like (not illustrated) of a cellular communications network 102 to determine the location of the user's device 108. The VPS 114 can also query the communications network for the location of the device 110, 112 from which the user is accessing the VPS 114. The VPS 114 can receive the location information relating to the devices 108, 110, 112 and determine if the determined locations match, or are within a designated distance, for example, a 25-mile radius, a city, a metropolitan area, a city block, a street, a building, and the like. Various hardware and software, for example, GPS receivers, network elements for determining device location, applications, programs, algorithms, and the like, can be used or accessed by the VPS 114 to determine the location of a user and/or user device 108 to provide location-based authentication.

Additionally, or alternatively, the VPS 114 can use the location of the user, or the user's device 108, to determine if the location matches an expected location. The expected location of the user can be based upon, for example, the user's schedule, the user's usage history, and the like. Some embodiments of the exemplary methods 600, 800, and 900 include the use of location-based authentication.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
   receiving, by a voiceprint password system, master voice data associated with a user of an application server;
   receiving master device data associated with the user, wherein the master device data comprises data that identifies a device used by the user when submitting the master voice data;
   receiving, by the voiceprint password system, a request from an entity for a password;
   obtaining test device data associated with the entity requesting the password;
   comparing the test device data with the master device data to determine whether the test device data substantially matches the master device data, wherein the test device data comprises data that identifies a device used by the entity requesting the password to access the voiceprint password system; and
   responsive to determining that the test device data substantially matches the master device data:
      obtaining sampled voice data from the entity requesting the password;
      comparing the sampled voice data to the master voice data to determine whether the sampled voice data and the master voice data substantially match;
      responsive to determining that the sampled voice data and the master voice data substantially match, determining, by the voiceprint password system, that the entity requesting the password should be authenticated; and
      generating the password requested by the entity responsive to the voiceprint password system determining that the entity requesting the password should be authenticated.

2. The method of claim 1, further comprising transmitting the password to the entity requesting the password.

3. The method of claim 1, further comprising:
   receiving master authentication data associated with the user, wherein the master authentication data comprises at least one of a password and user identification.

4. The method of claim 3, further comprising:
   challenging the entity requesting the password for test authentication data;
   receiving the test authentication data; and
   comparing the test authentication data with the master authentication data to determine whether the entity requesting the password should be authenticated.

5. The method of claim 4, wherein determining that the entity requesting the password should be authenticated comprises determining that the master authentication data and the test authentication data substantially match.

6. The method of claim 1, further comprising:
   receiving master location data from a node of a communications network, wherein the master location data comprises data that identifies an expected location of a communications device associated with the user;
   receiving test location data, wherein the test location data comprises data that identifies a location of a communications device associated with the entity requesting the password; and
   comparing the test location data with the master location data to determine whether the entity requesting the password should be authenticated.

7. The method of claim 6, wherein determining that the entity requesting the password should be authenticated is based on the location of the communications device associated with the entity requesting the password and the expected location of the communications device associated with the user.

8. A system comprising:
   a processor; and
   a memory having stored thereon instructions that, when executed by the processor, cause the processor to perform operations comprising:
      receiving master voice data associated with a user of an application server;
      receiving master device data associated with the user, wherein the master device data comprises data that identifies a device used by the user when submitting the master voice data;
      receiving a request from an entity for a password;
      obtaining test device data associated with the entity requesting the password;
      comparing the test device data with the master device data to determine whether the test device data substantially matches the master device data, wherein the test device data comprises data that identifies a device used by the entity requesting the password to access a voiceprint password system; and
      responsive to determining that the test device data substantially matches the master device data:
         obtaining sampled voice data from the entity requesting the password;

comparing the sampled voice data to the master voice data to determine whether the sampled voice data and the master voice data substantially match;

responsive to determining that the sampled voice data and the master voice data substantially match, determining that the entity requesting the password should be authenticated; and generating the password requested by the entity responsive to determining that the entity requesting the password should be authenticated.

9. The system of claim 8, wherein the instructions further comprise instructions executable by the processor to cause the processor to perform operations comprising:

transmitting the password to the entity requesting the password.

10. The system of claim 8, wherein the instructions further comprise instructions executable by the processor to cause the processor to perform operations comprising:

receiving master authentication data associated with the user, wherein the master authentication data comprises at least one of a password and user identification.

11. The system of claim 10, wherein the instructions further comprise instructions executable by the processor to cause the processor to perform operations comprising:

challenging the entity requesting the password for test authentication data;

receiving the test authentication data; and comparing the test authentication data with the master authentication data to determine whether the entity requesting the password should be authenticated.

12. The system of claim 11, wherein determining that the entity requesting the password should be authenticated comprises determining that the master authentication data and the test authentication data substantially match.

13. The system of claim 8, wherein the instructions further comprise instructions executable by the processor to cause the processor to perform operations comprising:

receiving master location data from a node of a communications network, wherein the master location data comprises data that identifies an expected location of a communications device associated with the user;

receiving test location data, wherein the test location data comprises data that identifies a location of a communications device associated with the entity requesting the password; and comparing the test location data with the master location data to determine whether the entity requesting the password should be authenticated.

14. The system of claim 13, wherein determining that the entity requesting the password should be authenticated is based on the location of the communications device associated with the entity requesting the password and the expected location of the communications device associated with the user.

15. A non-transitory computer readable storage device having stored thereon computer readable instructions that, when executed by a processor, cause the processor to perform operations comprising:

receiving master voice data associated with a user of an application server;

receiving master device data associated with the user, wherein the master device data comprises data that identifies a device used by the user when submitting the master voice data;

receiving a request from an entity for a password;

obtaining test device data associated with the entity requesting the password;

comparing the test device data with the master device data to determine whether the test device data substantially matches the master device data, wherein the test device data comprises data that identifies a device used by the entity requesting the password to access a voiceprint password system; and responsive to determining that the test device data substantially matches the master device data:

obtaining sampled voice data from the entity requesting the password;

comparing the sampled voice data to the master voice data to determine whether the sampled voice data and the master voice data substantially match;

responsive to determining that the sampled voice data and the master voice data substantially match, determining that the entity requesting the password should be authenticated; and generating the password requested by the entity responsive to the voiceprint password system determining that the entity requesting the password should be authenticated.

16. The non-transitory computer readable storage device of claim 15, wherein the instructions further comprise instructions that, when executed by the processor, cause the processor to perform operations comprising:

receiving master authentication data associated with the user, wherein the master authentication data comprises at least one of a password and a user identification.

17. The non-transitory computer readable storage device of claim 16, wherein the instructions further comprise instructions that, when executed by the processor, cause the processor to perform operations comprising:

challenging the entity requesting the password for test authentication data;

receiving the test authentication data; and comparing the test authentication data with the master authentication data to determine whether the entity requesting the password should be authenticated.

18. The non-transitory computer readable storage device of claim 17, wherein determining that the entity requesting the password should be authenticated comprises determining that the master authentication data and the test authentication data match.

19. The non-transitory computer readable storage device of claim 15, wherein the instructions further comprise instructions that, when executed by the processor, cause the processor to perform operations comprising:

receiving master location data from a node of a communications network, wherein the master location data comprises data that identifies an expected location of a communications device associated with the user;

receiving test location data, wherein the test location data comprises data that identifies a location of a communications device associated with the entity requesting the password; and comparing the test location data with the master location data to determine whether the entity requesting the password should be authenticated.

20. The non-transitory computer readable storage device of claim 19, wherein determining that the entity requesting the password should be authenticated is based on the location of the communications device associated with the entity requesting the password and the expected location of the communications device associated with the user.

* * * * *